United States Patent [19]

Hake

[11] 4,050,524
[45] Sept. 27, 1977

[54] CULTIVATOR TOOTH CLAMP

[75] Inventor: Kenneth A. Hake, Tipton, Kans.

[73] Assignee: Kent Manufacturing Co., Inc., Tipton, Kans.

[21] Appl. No.: 687,311

[22] Filed: May 17, 1976

[51] Int. Cl.² .............................................. A01B 23/02
[52] U.S. Cl. ................................... 172/707; 403/395; 172/643
[58] Field of Search .............. 172/707, 708, 763, 643, 172/711; 403/395

[56] References Cited

U.S. PATENT DOCUMENTS

| 322,351 | 7/1885 | Cook | 172/707 |
|---|---|---|---|
| 3,380,786 | 4/1968 | Peterson | 172/708 |
| 3,618,675 | 11/1971 | Hornung | 172/707 |
| 3,827,505 | 8/1972 | Sosalla | 172/763 |
| 3,896,883 | 7/1975 | Howes | 172/707 |
| 3,976,145 | 8/1976 | Blair | 172/763 |

FOREIGN PATENT DOCUMENTS

| 451,611 | 2/1913 | France | 172/708 |

Primary Examiner—Richard J. Johnson
Attorney, Agent, or Firm—Fishburn, Gold & Litman

[57] ABSTRACT

A clamp for mounting an agricultural spring tooth to a square cross section tool bar includes an L-shaped angle bracket, one leg having a transverse slot near a free end thereof, the other leg having a bolt receiving aperture near its end, and a partially channel shaped retaining clip having a transverse slot near one end and a bolt receiving aperture near the other end. The bracket is mounted on the tool bar in contact with two adjacent sides of the square bar, the mounting of the spring tooth shank being received in the bracket slot and contacting another side of the bar, and the clip being overlayed on the mounting shank with the end of the one leg received in the clip slot. A bolt is passed through the other leg, the clip, and the shank, clamping same together on the tool bar. Side flanges on the retaining clip rest adjacent side edges of the mounting shank whereby, in cooperation with the clip slot, lateral pivoting of the tooth is resisted.

7 Claims, 6 Drawing Figures

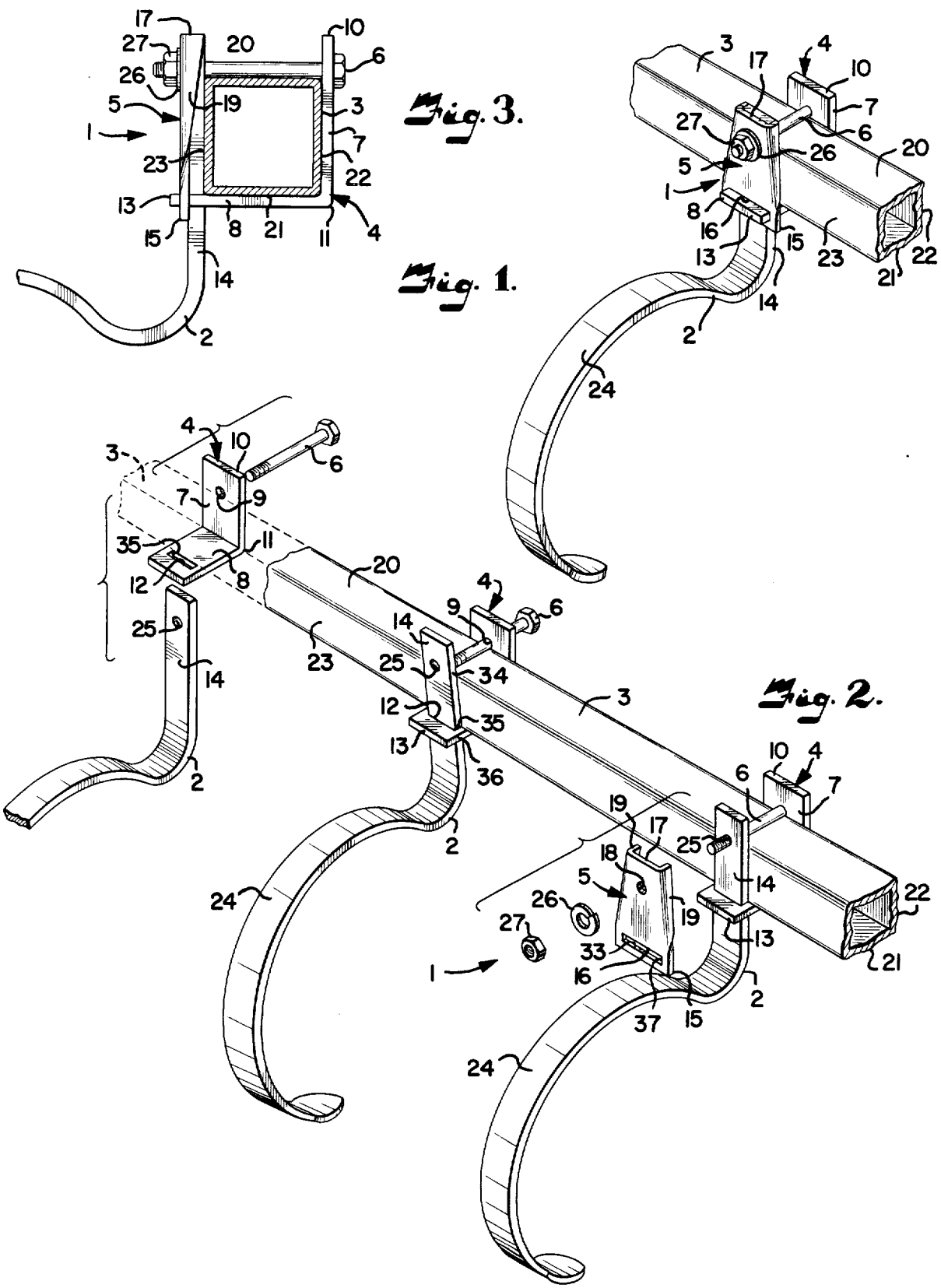

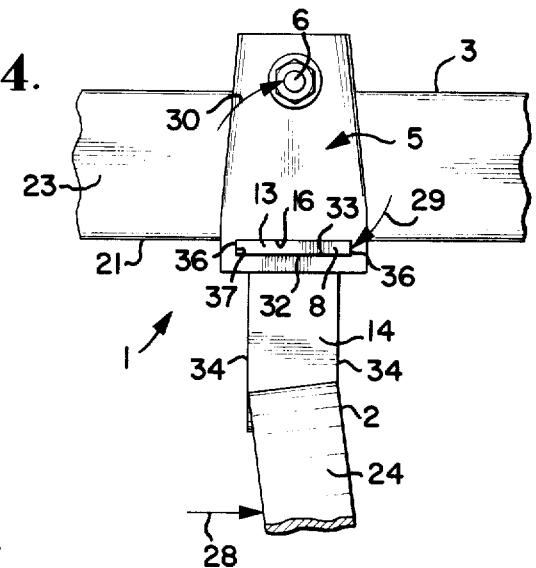
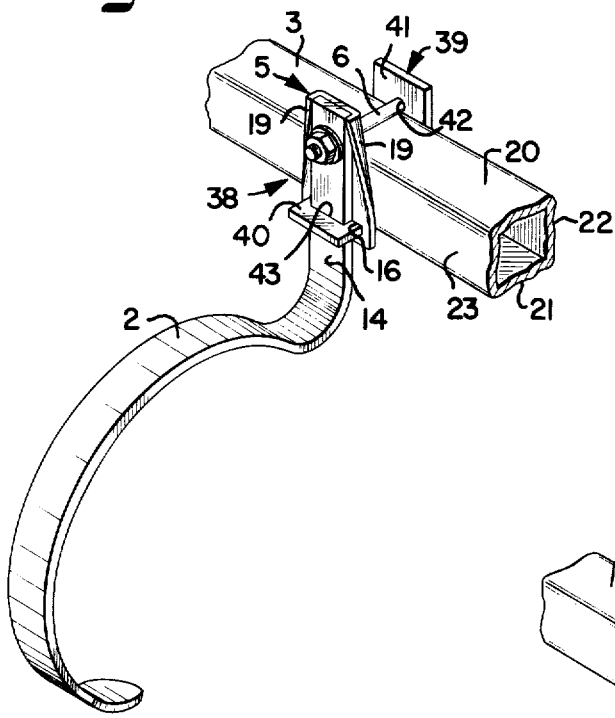
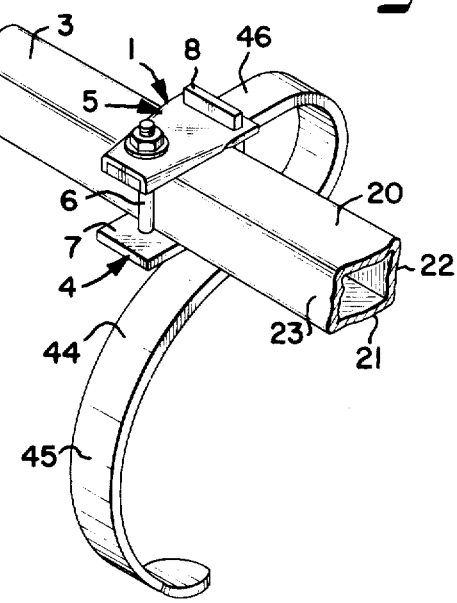

CULTIVATOR TOOTH CLAMP

The present invention relates to means for mounting agricultural implements to implement carrier frame members and more particularly to a clamp for mounting a spring tooth to a square cross section tool bar.

In general, the spring tooth is a rigidly mounted earth working tool that is designed to resiliently deflect upon encountering an obstruction, such as a rock, root, etc., to reduce the liklihood of damage. Prior art includes mounts for such teeth, generally employing a single bolt for each tooth with means to resist loosening of the tooth and lateral pivoting. In some of the previously disclosed clamps, the anti-pivoting means appear inadequate unless the clamp is undesirably heavy. In others, the clamp is of relatively complex design requiring relatively expensive manufacturing processes. In still others, slight deformation of the clamp may render same unserviceable or, at least, require time consuming repair before the clamp is returned to service.

The principal objects of the present invention are: to provide a clamp for mounting a spring tooth to a square cross section agricultural tool bar; to provide such a clamp which rigidly attaches the tooth to the tool bar; to provide such a clamp which includes an L-shaped bracket, a retaining clip, and a single bolt passing through the bracket, clip and the tooth to clamp same on the tool bar; to provide such a clamp wherein the retaining clip maintains a fixed relationship between the bolt and a leg of the bracket engaged by the clip; to provide such a clamp wherein the retaining clip includes side flanges adjacent the side edges of the mounting shank of the tooth and non-round slot walls engaging a portion of the bracket to prevent the tooth from pivoting about a horizontal axis perpendicular to the tool bar; to provide such a clamp wherein the retaining clip reinforces the portion of the bracket passing therethrough for additional resistance against lateral tooth pivoting; to provide such a clamp wherein forces tending to loosen the bolt are isolated therefrom; to provide such a clamp whereof slight deformation of the parts does not render the clamp unserviceable; and to provide a spring tooth mounting clamp which is economical to manufacture, durable, easily maintained in use, and which is particularly well adapted for its intended purpose.

Other objects and advantages of this invention will become apparent from the following description taken in connection with the accompanying drawings wherein are set forth by way of illustration and example certain embodiments of this invention.

FIG. 1 is a perspective view showing the clamp and a spring tooth mounted on a tool bar.

FIG. 2 is a fragmentary, exploded perspective view showing a plurality of spring teeth in successive stages of assembly with the component parts of the clamp on a tool bar.

FIG. 3 is an enlarged fragmentary side elevational view of the clamp and the mounting shank of a spring tooth clamped on a tool bar.

FIG. 4 is an enlarged fragmentary rear elevational view thereof, the tooth being urged laterally.

FIG. 5 is a perspective view showing an alternate assembly thereof.

FIG. 6 is a perspective view showing the clamp with a "short" spring tooth on a tool bar.

Referring to the drawings in more detail:

The reference numeral 1 generally designates a spring tooth clamp, here shown mounting an S-shaped agricultural tooth 2 to a square cross section tool bar 3. The tool bar 3 constitutes one transverse member of a typical agricultural implement mounting frame (not shown). The principal components of the clamp 1 are an L-shaped bracket 4, a retaining clip 5, and a bolt 6.

The bracket 4 has planar legs 7 and 8 joined in a right dihedral angle as best shown in FIG. 2. One of the legs has a bolt receiving aperture 9 formed adjacent a free end 10. The aperture 9 is spaced from a bend or dihedral vertex 11 a distance substantially equal to one of the sides of the tool bar 3. The other leg 8 has an elongated, rectangular slot 12 formed adjacent a free end 13. The slot 12 is sized to closely receive therethrough a straight or planar mounting shank 14 of the spring tooth 2. The slot 12 is spaced from the vertex 11 a distance substantially equal to a side of the tool bar 3.

The retaining clip 5, in this example, is a partially planar and partially channel shaped member. A planar end 15 thereof has a transverse, rectangular slot 16 extending therethrough and sized to closely receive the free end 13 of the bracket leg 8. The other end 17 exhibits a bolt receiving aperture 18 laterally centered therein. Laterally spaced angular flanges 19 project normally from the side edges thereof, beginning adjacent the end 17. The flanges 19 are spaced apart a suitable distance to closely receive therebetween the shank 14. The clip 5 may be manufactured by any suitable process as stamping a presized blank of plate stock.

The assembly illustrated in FIGS. 1–4 includes a typical "long" spring tooth 2. In this arrangement the tool bar 3 is shown as a square tubular member having a top side 20, a bottom side 21, a front side 22, and a rear side 23. The bracket 4 is held to the tool bar 3 with the leg 7 overlying the front side 22 of the bar 3 and the leg 8 overlying the bottom side 21. The bolt 6 extends through the aperture 9 and the shank 14 projects through the slot 12 with the arcuate portion 24 of tooth 2 circling rearwardly from the shank 14. The bolt aperture 25 of the tooth 2 also receives the bolt 6, as is best illustrated in FIG. 2. The retaining clip 5 overlies the shank 14 with the bolt 6 received in the aperture 18 and the free end 13 of leg 8 received in the slot 16. A lock washer 26 is located between a nut 27 and the exposed face of the clip 5. The tightened nut 27 on the bolt 6 effects clamping engagement of the bracket 4, tooth 2 and clip 5 on the tool bar 3.

In normal use, the tooth 2 is pulled through the soil point first, subjecting the shank 14 primarily to forces tending to increase shank pressure against the rear side 23 of the tool bar. However, upon encountering a rock, root, etc., the arcuate working portion 24, which has a degree of resilience, often flexes sideways in order to travel around the obstruction. Such transverse displacement or pivoting is resisted by the mounting shank 14 applying to the clamp 1 an angular moment having a horizontal axis perpendicular to the tool bar 3 and passing through the clamp 1 between the bolt 6 and the lower leg 8.

This angular moment tends to push or spread the bolt 6 and the leg 8 in opposite directions. As illustrated in FIG. 4, a lateral force 28, applied to the tooth 2, is generally resisted or balanced by the clamp 1 as forces 29 on the leg 8 and 30 on the bolt 6. The stabilizing forces resisting lateral movement of the tooth 2, as well as resisting forces reacting to normal working pressures, are amply supplied by the rigid retention of the bracket 4 against the tool bar bottom side 21 in combination with the clamping bolt 6. Without the retaining clip 5, the leg 8 would have a tendency to slide downwardly on the shank 14, resulting in the clamp loosening if the force 28 were strong enough to exceed frictional resistance between the walls of the slot 12 in leg 8 and the shank 14.

However, with the clip 5 in place, the spatial relationship between the bolt 6 and the leg 8 is relatively fixed and the leg 8 is prevented from sliding down the shank 14 by contact of the lower surface 32 with the lower wall 33 of the slot 16. Furthermore, rotation of the shank 14 about the bolt 6 is resisted by the combining and cooperation of frictional forces and/or abutments between the side edges 34 of the shank 14 with the end walls 35 of the slot 12, the side edges 36 of the leg 8 with the end walls 37 of the slot 16, and the flanges 19 with the shank side edges 34.

A modified clamp assembly 38 is illustrated in FIG. 5. All components of the clamp 38 are the same as those described in connection with the clamp 1 except for a modified bracket 39 characterized by the slotted leg 40 being lengthened an amount roughly equal to the thickness of the retaining clip 5.

In the modified clamp assembly 38 the bracket 39 is held to the tool bar 3 with the slotted leg 40 contacting the bottom side 21 of the bar and with the other leg 41 contacting the front surface 22. The retaining clip 5 is received on the rear side 23 of the bar 3 with the free end of the leg 40 in the slot 16 and the flanges 19 projecting rearwardly from the rear side 23. The bolt 6 extends through an aperture 42 in the leg 41 and through the aperture 18 of the clip. The shank 14 extends through a slot 43 in the leg 40 and the washer 26 and nut 27 function as noted above.

Cooperation of the component parts of the modified clamp 38 is similar to that of the clamp 1 in preventing rotation of the tooth 2 about a horizontal axis perpendicular to the bar 3.

FIG. 6 illustrates the use of the clamp 1 to attach a "short" tooth 44 to the tool bar 3. The short tooth 44, in this example, comprises an S-shaped cultivator spring implement having an arcuate working portion 45 similar to the arcuate portion 24 of the long tooth 2. However, the mounting shank 46 of the tooth 44 is designed to lie in a horizontal position when the tooth 44 is mounted. Use of the clamp 1 to mount the tooth 44 is essentially similar to that described in connection with the tooth 2, except that the bracket 4 is mounted with the leg 7 contacting the bottom side 21 of the bar 3 and with the leg 8 contacting the front side 22 thereof. Also, the tooth 44 is mounted with the shank 46 in contact with the top side 20 of the bar.

While use of the clamps embodying this invention is described in association with spring teeth, they obviously may be used to mount other agricultural implements having a mounting shank similar to the shanks 14 and 46.

It is to be further understood that while certain embodiments of this invention have been illustrated and described, it is not to be limited thereto except insofar as such limitations are included in the following claims.

What is claimed and desired to secure by Letters Patent Is:

1. A clamp for mounting an agricultural implement to a square section tool bar, said implement being at times subject to transverse force components parallel to said bar and having a substantially planar mounting shank with opposite side edges, said clamp comprising:
   a. an L-shaped bracket having planar legs disposed at substantially a right dihedral angle, said bracket being adapted for mounting on said bar with said legs engaging adjacent sides thereof;
   b. one of said legs having an elongated shank slot adjacent a free end thereof and sized to closely receive said shank, the longitudinal dimension of said slot extending parallel to the dihedral vertex common to said legs;
   c. retaining clip adapted to engage said shank and having an elongated key slot adjacent one end thereof and sized to closely receive said one leg free end, said clip being mounted with said one leg free end recived in said key slot; and
   d. fastening means for joining said bracket, clip, and shank to said bar in clamped engagement thereby resisting the pivoting of said implement about a horizontal axis perpendicular to said bar.

2. A clamp for mounting an agricultural implement to a square cross section tool bar, said implement being at times subject to transverse force components parallel to said bar and having a substantially planar mounting shank with opposite side edges, said clamp comprising:
   a. an L-shaped bracket having planar legs disposed at substantially a right dihedral angle, said bracket being adapted for mounting on said bar with said legs engaging adjacent side thereof;
   b. one of said legs having an elongated shank slot adjacent a free end thereof and sized to closely receive said shank, the longitudinal dimension of said slot extending parallel to the dihedral vertex common said legs;
   c. a retaining clip adapted to engage said shank;
   d. fastening means for joining said bracket, clip, and shank to said bar in clamped engagement; and
   e. keying means on said clip in cooperative engagement with said one leg free end and thereby resisting the pivoting of said implement about a horizontal axis perpendicular to said bar, said keying means being an elongated key slot formed on said clip adjacent one end thereof and sized to closely receive said one leg free end, said clip being mounted with said one leg free end received in said key slot.

3. The clamp as set forth in claim 2 wherein:
   a. said clip comprises a central web and laterally spaced flanges;
   b. said flanges are spaced apart a distance substantially equal to the width of said shank; and
   c. said clip is mounted with said flanges closely engaging said shank side edges whereby cooperation between said flanges engaging said shank and said keying means provides resistance against said implement pivoting about said horizontal axis.

4. The clamp as set forth in claim 2 wherein:
   a. said other leg has a bracket bolt receiving aperture formed adjacent a free end;
   b. said clip has a clip bolt receiving aperture formed adjacent the other end, said clip aperture being alignable with said bracket aperture; and
   c. said fastening means includes a bolt passing through said bracket and clip apertures.

5. The clamp as set forth in claim 2 wherein:
   a. said one leg shank slot is spaced from said vertex a distance substantially equal to the width of a side of said tool bar plus the thickness of said clip; and b. said clip is positioned between and in engagement with the side of said bar opposite said other leg and a shank of an agricultural implement.

6. The clamp as set forth in claim 5 wherein:
   a. said clip comprises a central web and laterally spaced flanges;
   b. said flanges are spaced apart a distance substantially equal to the width of said shank; and
   c. said clip is mounted with said flanges closely engaging said shank sides edges whereby cooperation between said flanges engaging said shank and said keying means provides resistance against said implement pivoting about said horizontal axis.

7. In combination, a clamp, an agricultural implement and a square cross section bar, said clamp mounting said implement to said bar, said implement being at times subject to transverse force components parallel to said bar and having a substantially planar mounting shank with opposite parallel side edges and a bolt receiving aperture formed adjacent a free end thereof, said clamp being an angular bracket having one leg with a bolt receiving aperture adjacent a free end thereof, another leg having a slot adjacent a free end thereof for receiving said shank, and having a portion of said other leg projecting beyond said slot, said clamp being mounted on said tool bar with said legs engaging adjacent sides of said bar and said shank being received in said bracket slot and engaging a side of said bar opposite that engaged by said one leg, said shank aperture and said bracket aperture being aligned and receiving a bolt therethrough, the improvement comprising:
   a. a retaining clip mounted in contact with said shank;
   b. said clip having a clip slot closely receiving said other leg portion;
   c. said clip having laterally spaced flanges closely receiving said shank side edges therebetween; and
   d. said clip having a bolt receiving aperture spaced from said clip slot, said clip aperture being aligned with said shank aperture and said bracket aperture, said bolt being received through said apertures and a nut threaded on said bolt, whereby said retaining clip provides resistance against said implement pivoting about a horizontal axis perpendicular to said tool bar in response to said transverse force components.

* * * * *